L. JONES.
STOP COCK.
APPLICATION FILED NOV. 5, 1907.

901,621.

Patented Oct. 20, 1908.

Inventor
Lebbens Jones

UNITED STATES PATENT OFFICE.

LEBBENS JONES, OF BROOMFIELD, WEST VIRGINIA.

STOP-COCK.

No. 901,621.    Specification of Letters Patent.    Patented Oct. 20, 1908.

Application filed November 5, 1907.   Serial No. 400,901.

*To all whom it may concern:*

Be it known that I, LEBBENS JONES, citizen of the United States, residing at Broomfield, in the county of Marion and State of West Virginia, have invented certain new and useful Improvements in Stop-Cocks, of which the following is a specification.

The present invention relates to certain new and useful improvements in valves, and more particularly to a novel stop cock which is peculiarly designed so as to be effectively employed in connection with extremely high pressures.

The invention appertains to that type of valves which comprise a hollow rotatable plug and has for its object to provide a strong and durable construction which can be readily operated to control the passage of a fluid therethrough when subjected to high pressures.

For a full description of the invention and the merits thereof and also to acquire a knowledge of the details of contruction and the means for effecting the result, reference is to be had to the following description and accompanying drawing.

Figure 1:
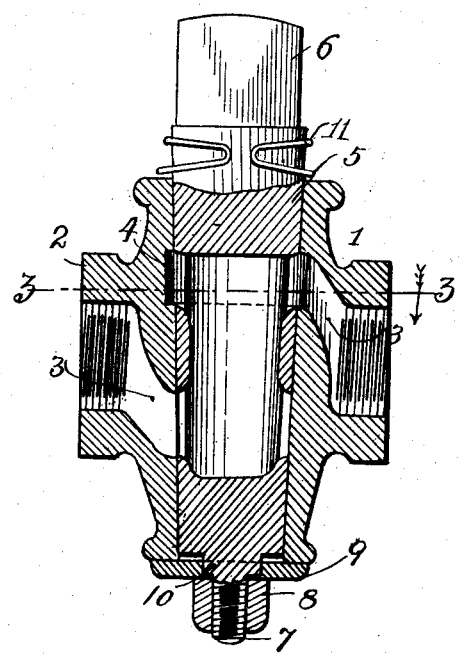
Figure 2:
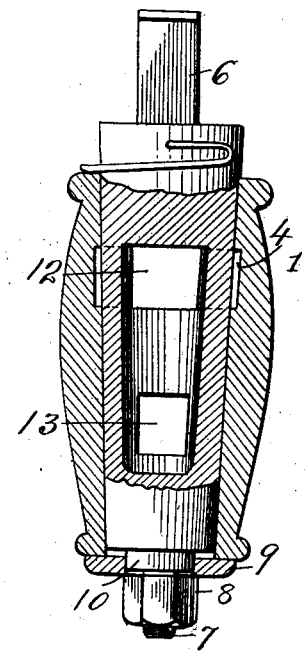
Figure 3:
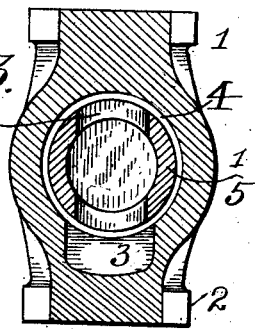
Figure 4:
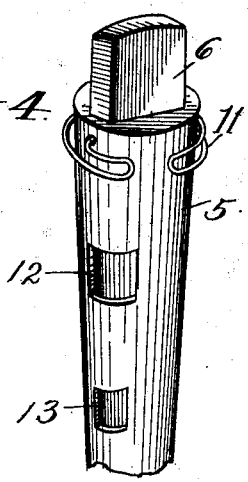
Figure 5:
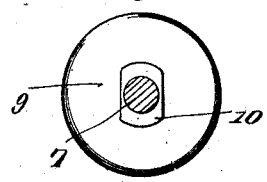

While the invention may be adapted to different forms and conditions by changes in the structure and minor details without departing from the spirit or essential features thereof, still the preferred embodiment is shown in the accompanying drawing, in which:

Figure 1 is a vertical sectional view through a valve embodying the invention. Fig. 2 is a similar view on a plane at right angles to that of Fig. 1. Fig. 3 is a horizontal sectional view on the line 3—3 of Fig. 1. Fig. 4 is a detail perspective view of the valve plug. Fig. 5 is a detail view of the washer and the portion of the valve plug to which it is attached.

Corresponding and like parts are referred to in the following description and indicated in all the views of the accompanying drawing by the same reference characters.

Specifically describing the invention the numeral 1 designates the valve casing which has a tubular formation and is contracted toward one end thereof, the said casing being provided upon its opposite sides with the coupling ends 2, which, in the present instance, are shown as arranged in alinement with each other. Each of these coupling ends 2 communicates with the interior of the casing 1 through a port 3 upon one side thereof, the said ports being out of alinement with each other and being disposed toward opposite ends of the casing 1. One of these ports 3 leads into an annular groove 4 upon the interior of the casing, and this port is designed to communicate with that coupling end to which the feed pipe is attached.

Rotatably mounted within the tubular casing 1 is a valve plug 5 having a tapered formation corresponding to the opening through the casing. The larger end of the plug 5 is formed with an angular head 6 designed to be engaged by a wrench of any conventional form for rotating the valve, while the reduced end of the plug is formed with a stem 7 threaded to receive a nut 8. A washer 9 is fitted upon an enlargement 10 at the base of the stem 7 and is held in position by means of the nut 8, the said enlargement 10 being formed with a flat face and the opening through the washer being of a corresponding shape whereby the washer is locked upon the stem so as to rotate with the valve. A spring 11 is applied to the larger end of the plug 5 and operates to exert an upward pressure upon the same and hold the washer 9 in a close engagement with the valve casing.

In the specific formation of the spring 11 it will be observed that the same is formed from a strip of strong wire which is bent partially around the stem and bears against the ends of the casing 1, the end portions of the spring strip being returned upon themselves and having their extremities embedded in or otherwise permanently connected to opposite sides of the valve plug. It will thus be seen that the returned ends of the spring strip constitute the spring arms and tend to withdraw the plug from the casing.

The valve plug 5 itself has a hollow formation and the interior of the chamber therein communicates with two sets of openings 12—12 and 13—13 designed to communicate with the coupling ends 2 through the ports 3. The openings of each set are shown as arranged diametrically opposite to each other and the openings 12—12 are always in communication with the annular groove 4, while the openings 13—13 can be caused to communicate with the port 3 leading to the coupling end connected to the outlet pipe by suitably rotating the plug. It will thus be apparent that the interior of the valve plug is always in communication with the supply pipe and is always under pressure, a balanced construction being thereby obtained which enables the valve plug to be readily rotated even when the fluid passing through the valve is under an extremely high pressure.

Having thus described the invention, what is claimed as new is:

1. In a valve, the combination of a tubular casing a valve plug rotatably mounted within the tubular casing, a washer at one end of the valve plug for engaging the corresponding end of the casing, and a spring at the opposite end of the plug, the said spring being formed of a strip extending partially around the plug and having the end portions thereof returned upon themselves, the said returned end portions having their extremities secured to the plug and having a spring action tending to withdraw the plug from the casing.

2. In a valve, the combination of a tubular casing of tapered formation, the said casing being provided in its sides with an inlet port and an outlet port not in alinement with each other, a tapered valve plug of hollow formation rotatably mounted within the tubular casing and provided with openings adapted to establish communication with the inlet port and outlet port respectively, a washer at the tapered end of the valve plug for engaging the end of the casing, and a spring at the opposite end of the plug, the said spring being formed of a spring strip extending partially around the plug and having the end portions thereof returned upon themselves, the said returned end portions having their extremities secured to opposite sides of the plug and having a spring action tending to withdraw the plug from the casing.

3. In a valve, the combination of a casing, a valve plug rotatably mounted within the casing, one end of the valve plug loosely engaging the casing, and a spring at the opposite end of the plug, the said spring being formed of a strip extending partially around the plug and having the end portions thereof returned upon themselves, the said returned end portions having their extremities secured to the plug and having a spring action tending to withdraw the plug from the casing.

In testimony whereof I affix my signature in presence of two witnesses.

LEBBENS JONES. [L. S.]

Witnesses:
 DAVID WEED,
 MARIE WEED.